(12) United States Patent
Hallundbæk (10) Patent No.: US 11,814,115 B2
(45) Date of Patent: Nov. 14, 2023

(54) LOW PLATFORM BUS WITH STEERING MODULES

(71) Applicant: Alpha EC Industries 2018 S.à.r.l., Luxembourg (LU)

(72) Inventor: Jørgen Hallundbæk, Luxembourg (LU)

(73) Assignee: ALPHA EC INDUSTRIES 2018 S.A.R.L., Luxembourg (DE)

( * ) Notice: Subject to any disclaimer, the term of this patent is extended or adjusted under 35 U.S.C. 154(b) by 523 days.

(21) Appl. No.: 16/775,699

(22) Filed: Jan. 29, 2020

(65) Prior Publication Data

US 2020/0239064 A1    Jul. 30, 2020

(30) Foreign Application Priority Data

Jan. 29, 2019   (LU) ........................................ 101110

(51) Int. Cl.
*B62D 5/04* (2006.01)
*B62D 3/04* (2006.01)
(Continued)

(52) U.S. Cl.
CPC .............. *B62D 5/0403* (2013.01); *B62D 3/04* (2013.01); *B62D 5/04* (2013.01); *B62D 5/06* (2013.01); *B62D 7/18* (2013.01); *B62D 31/02* (2013.01)

(58) Field of Classification Search
CPC .......... B62D 5/0403; B62D 3/04; B62D 5/04; B62D 5/06; B62D 7/18; B62D 31/02
See application file for complete search history.

(56) References Cited

U.S. PATENT DOCUMENTS

| | | | | |
|---|---|---|---|---|
| 1,710,616 A | * | 4/1929 | Guernsey ............... | B62D 31/04 296/64 |
| 4,393,955 A | * | 7/1983 | Van Mullem .......... | B62D 31/02 180/312 |

(Continued)

FOREIGN PATENT DOCUMENTS

| | | |
|---|---|---|
| CN | 102673380 A | 9/2012 |
| CN | 203427870 U | 2/2014 |

(Continued)

OTHER PUBLICATIONS

U.S. Office Action from corresponding U.S. Appl. No. 16/775,732, dated Aug. 15, 2022, 22 pages.

(Continued)

*Primary Examiner* — Jacob D Knutson
(74) *Attorney, Agent, or Firm* — Rankin, Hill & Clark LLP (57) ABSTRACT

A bus with a low and thin passenger platform adapted for standing passengers, seat places are foreseen as well. The bus is an articulated bus with two or more units. It includes a passenger compartment, left steering modules and right steering modules. Each of these steering modules includes: a wheel with a rotation axis, a steering knuckle with an upper pivot joint and a lower pivot joint, a steering actuator for pivoting the corresponding steering knuckle about the upper pivot joint and the lower pivot joint. The bus further including a passenger platform delimiting the passenger compartment and transversally joining the left steering module and the right steering module, and the passenger platform being vertically disposed, at least partially, between the rotation axes of the wheels and the lower pivot joints.

19 Claims, 7 Drawing Sheets

(51) Int. Cl.
*B62D 7/18* (2006.01)
*B62D 3/02* (2006.01)
*B62D 5/06* (2006.01)
*B62D 31/02* (2006.01)

(56) References Cited

U.S. PATENT DOCUMENTS

| | | | | |
|---|---|---|---|---|
| 4,469,369 | A * | 9/1984 | Belik | B62D 31/025 296/193.04 |
| 4,934,733 | A * | 6/1990 | Smith | B60G 3/207 280/124.132 |
| 5,161,813 | A | 11/1992 | Yamashita et al. | |
| 6,276,474 | B1 * | 8/2001 | Ruppert | B60K 7/0007 180/65.6 |
| 6,354,616 | B1 * | 3/2002 | Morin | A61G 21/00 280/124.147 |
| 6,561,307 | B1 * | 5/2003 | Brill | B62D 5/0418 180/443 |
| 9,731,572 | B2 | 8/2017 | Tamura et al. | |
| 10,960,723 | B1 | 3/2021 | Hall et al. | |
| 2003/0040979 | A1 | 2/2003 | Borroni-Bird et al. | |
| 2003/0111834 | A1 * | 6/2003 | Ledesma | B62D 21/11 280/788 |
| 2004/0012162 | A1 | 1/2004 | Burke | |
| 2004/0036266 | A1 * | 2/2004 | Tardini | B62D 21/12 280/785 |
| 2006/0048978 | A1 | 3/2006 | Nagaya | |
| 2006/0214408 | A1 | 9/2006 | Davey | |
| 2006/0237242 | A1 | 10/2006 | Burke | |
| 2011/0209938 | A1 | 9/2011 | Basadzishvili | |
| 2014/0062043 | A1 | 3/2014 | Boterdaele et al. | |
| 2014/0300082 | A1 | 10/2014 | Szabo | |
| 2014/0353054 | A1 | 12/2014 | Matayoshi et al. | |
| 2015/0122560 | A1 | 5/2015 | Elrabaa | |
| 2016/0090134 | A1 | 3/2016 | Niu et al. | |

FOREIGN PATENT DOCUMENTS

| | | | |
|---|---|---|---|
| CN | 203996512 U | * | 12/2014 |
| CN | 203996512 U | | 12/2014 |
| CN | 106627102 A | | 5/2017 |
| CN | 107415675 A | | 12/2017 |
| CN | 107963124 A | | 4/2018 |
| CN | 207207729 U | | 4/2018 |
| DE | 102006037588 A1 | | 2/2008 |
| DE | 102015209595 A1 | | 12/2016 |
| EP | 1147927 A1 | | 10/2001 |
| EP | 1170162 A1 | | 1/2002 |
| EP | 2338764 A1 | | 6/2011 |
| EP | 3028927 A1 | | 6/2016 |
| FR | 2776966 A1 | | 10/1999 |
| GB | 2441655 A | | 3/2000 |
| JP | 2008-168803 A | | 7/2008 |
| JP | 2015-020586 A | | 2/2015 |
| KR | 200270848 U | | 4/2002 |
| WO | 2004/067358 A1 | | 8/2004 |
| WO | 2016/161216 A1 | | 10/2016 |

OTHER PUBLICATIONS

Luxembourg Search Report/Written Opinion dated Sep. 18, 2019, 8 pages.

* cited by examiner

LOW PLATFORM BUS WITH STEERING MODULES

TECHNICAL FIELD

The invention lies in the field of low platform busses. More precisely, the invention provides a bus with a low platform and a steering system. The invention also lies in the field of bus steering processes.

BACKGROUND OF THE INVENTION

Enlarging a bus offers a passenger capacity growth. Thus, the passenger compartment becomes larger and longer, and travels become more comfortable since there is more place for each individual. However, increasing the outer dimensions of a bus is limited by the environment constraints, notably by narrow streets with tight turns. In addition, cities design short bus stop in order to reduce the impact on streets. Therefore, steering capacities of busses must be high enough. Accessibility of busses is also an important aspect. It accelerates docking operation, and reduces stop time. Thus, an improved bus runs his circuit faster in spite of an increased number of passengers. The resulting transportation service becomes more effective.

The document EP 1 147 927 A1 discloses a front wheel suspension for buses. The bus comprises two connection pieces with wheels, and a single steering transmission linked to both connection pieces.

The document DE 10 2015 209 595 A1 discloses a steering module with a steering knuckle in two parts which swivel by means of gearings.

TECHNICAL PROBLEM TO BE SOLVED

It is an objective of the invention to present a bus, which overcomes at least some of the disadvantages of the prior art. In particular, it is an objective of the invention to optimise the mechanical strength of a bus.

SUMMARY OF THE INVENTION

According to a first aspect of the invention, it is provided a bus, notably an articulated bus, including a passenger compartment, a left steering module and a right steering module, each steering module including: a wheel with a rotation axis, a steering knuckle with an upper pivot joint and a lower pivot joint, a steering actuator for pivoting, the corresponding steering knuckle, notably with respect to the passenger platform and/or about the upper pivot joint and the lower pivot joint, the bus further including a passenger platform delimiting the passenger compartment and transversally joining the left steering module and the right steering module, the passenger platform being vertically disposed, at least partially, or totally, between the rotation axes of the heels and the lower pivot joints of the steering modules.

Preferably, the passenger platform comprises a horizontal middle plan at the mid thickness of the passenger platform, the horizontal middle plan being disposed between the rotation axes of the wheels and the lower pivot joints.

Preferably, the majority of the thickness of the passenger platform is vertically disposed between the rotation axis of the wheel and the lower pivot joint.

Preferably, each of the left steering module and the right steering module includes an upper swinging arm above the passenger platform joined to the corresponding upper pivot joint, and/or a lower swinging arm vertically level with the passenger platform and joined to the associated lower pivot joint.

Preferably, each steering knuckle includes an inner body connected to the passenger platform, and an outer body connected to the wheel, the inner body and the outer body being rotatably mounted with respect to each other about a vertical swivel axis.

Preferably, the steering actuator includes a worm drive in order to pivot the outer body with respect to the inner body, the worm drive notably including a worm rotatably linked to the inner body and a worm gear fixed to the outer body.

Preferably, the passenger platform projects transversally from the actuator of the left steering module to the actuator of the right steering module.

Preferably, at least one or each lower pivot joint include a horizontal pivot axis, the passenger platform being vertically disposed, at least partially, between the rotation axes of the wheels and the horizontal pivot axes of the lower pivot joints.

Preferably, the upper pivot joint and a lower pivot joint include an upper ball joint and a lower ball joint respectively.

Preferably, the passenger platform includes a transversal beam projecting transversally from the left steering module to the right steering module.

Preferably, the passenger platform includes a constant thickness between the left steering module and the right steering module, and/or all along them.

Preferably, the bus includes longitudinal beams at the interfaces between the passenger platform and the steering modules, the longitudinal beams being vertically disposed, at least partially, between the rotation axes of the wheels and the lower pivot joints.

Preferably, each of the left steering module and the right steering module includes a wheel housing, the passenger platform projecting from said wheel housings, and/or extends longitudinally the longitudinal ends of the wheel housings.

Preferably, the passenger platform includes a bottom surface below the rotation axes of the wheels.

Preferably, at least one steering knuckle is, or the steering knuckles are, vertically movable with respect to the passenger platform between an upper position and a lower position.

Preferably, the passenger platform includes a top surface delimiting the passenger compartment, in the lower position the top surface is above at least one or each rotation axis, and/or in the upper position the top surface is below at least one or each rotation axis and/or the bottom surface is above at least one lower pivot joint in the lower position, and notably below said lower pivot joints in the upper position.

Preferably, in the upper position at least one lower pivot joint is vertically level with the thickness of the passenger platform, and/or the distance D between the upper position and the lower position of at least one steering module is larger than the vertical thickness TH of the passenger platform.

Preferably, the left steering module and the right steering module form a first pair of steering modules, the bus further including a second pair of steering modules, the first pair and the second pair being notably identical, the passenger platform including a flat upper face connecting the first pair to the second pair.

Preferably, the longitudinal distance between the right wheels and/or between the left wheels is smaller than the distance D between the upper position and the lower position of at least one steering module.

Preferably, between the left steering module and the right steering module, the passenger platform projects over at least the majority of the of the width of the bus, notably over at least 1.50 m; and the width of the bus, optionally of the passenger platform, is of at most 2.55 m.

Preferably, the passenger platform forms a plate, notably of constant thickness.

Preferably, the passenger platform includes a lower half which is vertically disposed between at least one rotation axis and the associated lower pivot joint.

Preferably, at least one or each actuator is an electric actuator or a power converting actuator.

Preferably, the passenger platform is vertically disposed between at least one rotation axis and the horizontal pivot axis of the lower pivot joints.

Preferably, the whole thickness of the passenger platform is vertically disposed between the rotation axes of the wheel and the lower pivot joints, notably in the lower position.

The passenger platform forms a transversal separation between the left steering module and the right steering module.

Preferably, the steering actuators are fixed to the passenger platform and/or to the wheel housings.

Preferably, the passenger platform includes a one-piece element projecting from the left steering module to the right steering module.

Preferably, the ground clearance under the passenger platform is of at most 25 cm, or at most 18 cm, for instance in the lower position and in the upper position respectively.

Preferably, the altitude of the passenger platform is of at most 37, and/or at most 25 cm, notably in a driving configuration and in a boarding configuration of the bus, and/or in the lower position and in the upper position respectively.

Preferably, the distance D between the upper position and the lower position of at least one or of each steering module is comprised between 5 cm and 15 cm, preferably between 10 cm and 12 cm, values included.

Preferably, the lower pivot joints include lower ends which are below the passenger platform in the lower position.

Preferably, the passenger platform includes a main level, notably an upper surface, the rotation axis of at least one wheel being above said main level in the upper position.

Preferably, the wheels have a diameter of at most 75 cm, and a width W from 25 cm to 30 cm.

Preferably, each of the left steering module and the right steering module is adapted for an angular motion of at least 50°, or at least 80°, of the steering knuckles with respect to the passenger platform.

Preferably, the longitudinal distance between the right wheels and between the left wheels is smaller than the vertical thickness of the passenger platform, and/or the transversal width of the wheels.

Preferably, the lower pivot joints each include centre points which are below the passenger platform in the lower position.

Preferably, the ground clearance is larger than the vertical thickness of the passenger platform.

Preferably, the vertical thickness of the passenger platform may be the average vertical thickness and/or the maximum vertical thickness of the passenger platform.

Preferably, the inner diameter of the rim of the wheel may be larger than the distance from the upper pivot joint to the lower pivot joint.

Preferably, the left steering module and the right steering module are symmetric.

Preferably, at least one or each pivot joint includes: two ball joints or a ball joint and a hinge joint.

Preferably, the upper position and the lower position of each, or of said, or of at least one steering module are extreme opposite positions.

Preferably, the worm gear is above the passenger platform.

Preferably, the or each steering actuator is above the bottom surface.

Preferably, the or each steering actuator is fixed to the passenger platform, and/or housed in the passenger platform, and/or housed, at least partially, in the corresponding wheel housing.

Preferably, the vertical thickness of the passenger platform vertically crosses the or each steering actuator, notably on their whole height.

Preferably, at least one or each actuator being an electric actuator, or a pneumatic actuator, or a hydraulic actuator.

Preferably, at least one or each actuator being a power actuator, and/or an actuator converting a first kind of energy into another kind of energy.

Preferably, the passenger platform is between the actuators of the left and the right module.

Preferably, the lower pivot joint is the lowermost point of the passenger steering knuckle.

Preferably, in the upper position, the lower pivot joint is vertically level with the passenger platform.

Preferably, the upper plate is vertically between the wheel rotation axis and the lower pivot joint; at least in the upper position.

It is another aspect of the invention to provide a bus including a passenger compartment, a passenger platform delimiting the passenger compartment and physically connecting a left steering module to a right steering module, each steering module including:
  a wheel with a rotation axis above the bottom surface of the passenger platform,
  a steering knuckle with an upper pivot joint and a lower pivot joint which is disposed below the passenger platform,
  a steering actuator for pivoting the steering knuckle about the upper pivot joint and the lower pivot joint.

It is another aspect of the invention to provide a bus including a passenger compartment, a passenger platform delimiting the passenger compartment and physically connecting a left steering module to a right steering module, each steering module including:
  a wheel with a rotation axis above the bottom surface of the passenger platform,
  a steering knuckle with an upper pivot joint and a lower pivot joint,
  a steering actuator for pivoting the steering knuckle about the upper pivot joint and the lower pivot joint.
    the steering knuckle being movable vertically with respect to the passenger compartment between an upper position and a lower position, notably in the upper position, the lower pivot joints are disposed vertically level with the passenger platform; and/or in the lower position the rotation axes of the wheels are disposed above the passenger platform.

It is another aspect of the invention to provide a bus steering process, the bus optionally being in accordance with the invention, wherein the process includes the steps of transmitting a first steering instruction to the steering actuator of a first steering module, and communicating a second steering instruction to the steering actuator of the second steering module, said first and second instruction being different, and/or communicated at different times. The features "first" and "second" may designate a left and right one.

It is another aspect of the invention to provide a bus steering process for a bus, said bus comprising: a passenger compartment, a left steering module and a right steering module, each steering module including: a wheel with a rotation axis, a steering knuckle with an upper pivot joint and a lower pivot joint, a steering actuator for pivoting the corresponding steering knuckle, the bus further including a passenger platform delimiting the passenger compartment and between the left steering module and the right steering module, the passenger platform being vertically disposed, at least partially, between the rotation axes of the wheels and the lower pivot joints of the steering modules, wherein the bus steering process includes the steps of: transmitting a left steering instruction to the steering actuator of the left steering module, and communicating a right steering instruction to the steering actuator of the right steering module, said left and right instruction being different, and/or communicated at different times, the bus notably being in accordance with the invention.

Preferably, process further comprises the steps of: transmitting a second left steering instruction to the steering actuator of the left steering module, and communicating a second right steering instruction to the steering actuator of the right steering module, said second left and second right instruction being identical and/or simultaneous.

The different aspects of the invention may be combined to each other. In addition, the preferable options of each aspect of the invention may be combined with the other aspects of the invention, unless the contrary is explicitly mentioned.

Technical Advantages of the Invention

The invention provides a solution which optimises the mechanical resistance and the inner space within the passenger compartment. The invention offers a atilt passenger platform which, at a low position, forms a robust link between the steering module. Accordingly, the ground clearance is maintained while preserving a high passenger capacity. The rest of the structures is less mechanically stressed.

The vertical positioning the wheels with respect to the passenger platform permits to arrange the lower pivot joints closer to the level of said passenger platform. Thus, the vertical distance between the lower pivot joint and the platform is reduced and the mechanical stress is communicated from one another through a shorter mechanical path. The flexion stress within the passenger platform may be reduced. This solution becomes even more interesting when a cylinder acts on the lower swinging arm. Indeed, an important proportion of the bus load is borne by the lower swinging arm in this configuration.

The solution promoted by the invention remains interesting with multiple wheels because the load is distributed around the passenger platform. This approach allows to reduce the size of the wheels and the height of the wheel housings. Thus, the bus structure design is less constrained by the wheel integration, and the platform may remain of constant thickness; which is also a technical benefit of the invention. The passenger platform easily keeps a flat top surface.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes the invention in further detail based on preferred embodiments and on the figures. Similar reference numbers will be used to describe similar or the same concepts throughout different embodiments of the invention.

It should be noted that features described for a specific embodiment described herein may be combined with the features of other embodiments unless the contrary is explicitly mentioned.

Features commonly known in the art will not be explicitly mentioned for the sake of focusing on the features that are specific to the invention. For example, the bus in accordance with the invention is evidently driven by an engine coupled to wheels, even though such engine is not explicitly referenced on the figures nor referenced in the description.

By way of convention, it may be defined that the word "longitudinal" refers to the longitudinal direction and may correspond to the main driving direction of the bus. The word "transversal" refers to the transversal direction and may be perpendicular to the longitudinal direction. It may be understood that the directions are not strictly used for defining the invention. Indeed, each direction used below may include a variation of at most: 10°, or 5°, or 2°, with respect to a strict meaning.

The skilled in the art will understood that a vertical swivel axis may be inclined with respect to the vertical direction.

The word "inner" and "outer" may be considered transversally. "Inner" may mean toward the centre, and outer toward the environment. It may be understood that a beam is horizontal. The word "level" may be considered with respect to the ground, notably a flat ground on which the bus is.

In the current invention, an actuator is a machine which moves or controls another part in response to an input.

Figure 1:
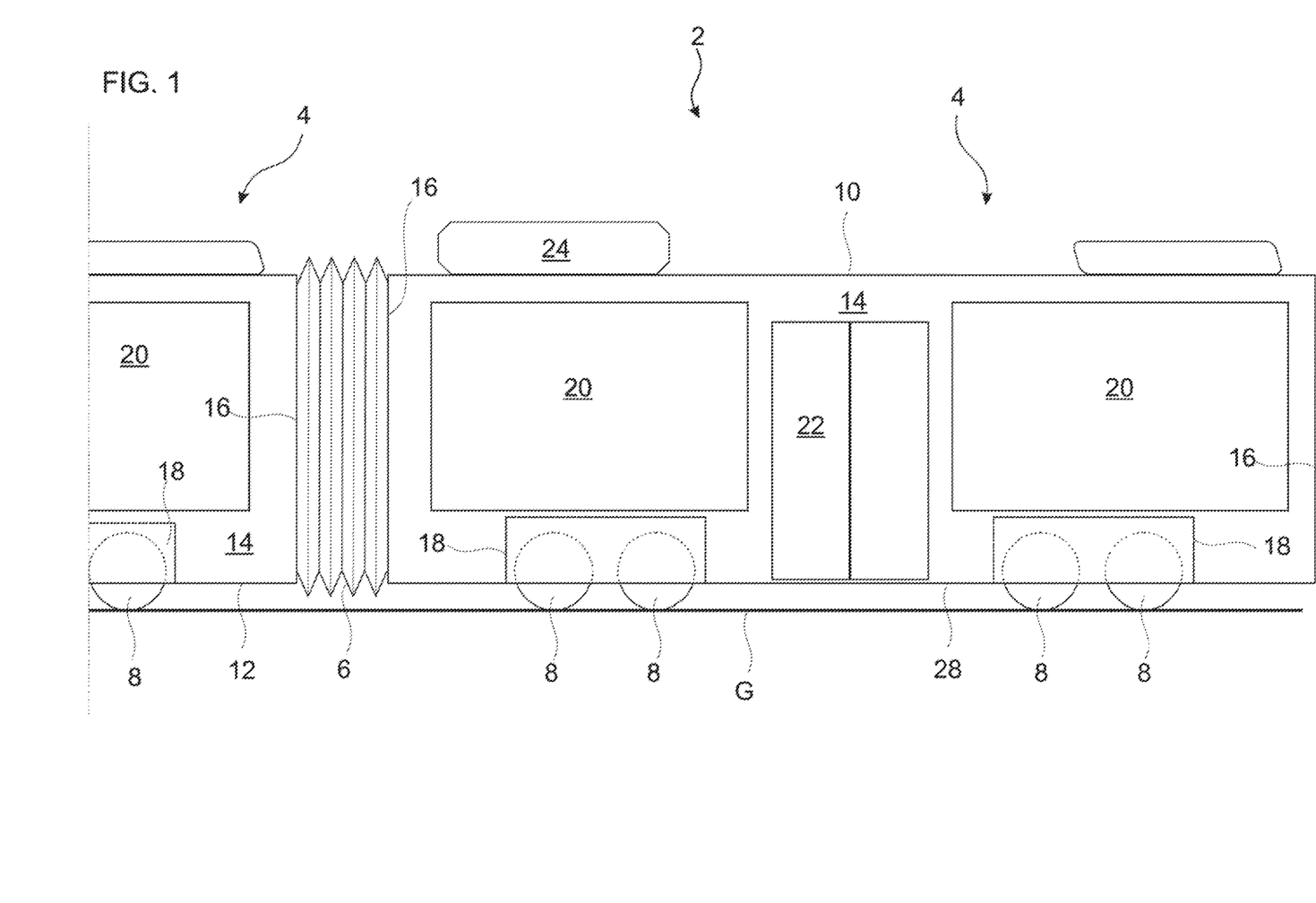
FIG. 1 provides a schematic illustration of a side view of a bus in accordance with a preferred embodiment of the invention.

FIG. 1 shows a vehicle for mass transportation. The vehicle is adapted for transportation of passengers in cities and may transport about one hundred passengers, for instance one hundred and twenty passengers. The vehicle may be a bus 2, notably an electric bus 2. The bus 2 may include electric driving engines and electric batteries (not represented) powering the electric driving engines.

The bus 2 may be an articulated bus. It may comprise a first unit 4 and a second unit 4 (partially represented). Each unit 4, may form a body, and/or may form a rigid element. Each unit 4 may be a trailer and/or a tractor. Each unit 4 may be self-supporting. The units 4 may be similar or identical. These units 4 may be joined by a connection, for instance a hinged connection 6 enabling the units 4 to swivel with respect to each other. In the current illustrative example, only two units 4 are represented, however it is contemplated in the current invention that the electric bus 2 includes three, four, or more units 4, which are articulated with respect to one another by hinged connection 6. Then, the passenger capacity may be more than two hundred.

A bus formed of a single unit is also considered.

Each unit 4 may include several wheels 8 engaging the ground G. Pairs of symmetric wheels 8 may form axles, for instance four axle for each unit 4. The axles and thus the wheels 8 may be distributed along the length oldie bus 2. At least one pair of wheels is formed of steered wheels.

Optionally, each wheel 8 of the bus 2 or of at least one unit 4 are steered wheels. The steered wheels may be part of steered modules. The wheels 8, notably the steered wheels, may be driving wheels.

The bus 2 may include a structure. The structure may include a roof 10, and/or a passenger platform 28, and/or side walls 14. The side walls 14 may be outer walls. Two transversally opposite side walls 14 may go down from the roof 10 to the passenger platform 28. The side walls 14 may also project longitudinally from one longitudinal end 16 to the opposite longitudinal end 16. They may form the body-work of the bus 2. They may cover transversally the wheels 8.

For instance; the side walls 14 may close the wheel housings 18. The latter may notably receive the wheels 8 by couples. Optionally, at least one or each wheel housing 18 may receive two longitudinally spaced wheels 8. Thee wheel housings 18 may form downwardly open boxes.

The side walls 14 may receive windows 20. Optionally, doors 22 are be arranged in one of the two side walls 14, notably between windows 20. The roof 10 may support equipment, for instance an air conditioning system 24, and other systems as well.

Figure 2:
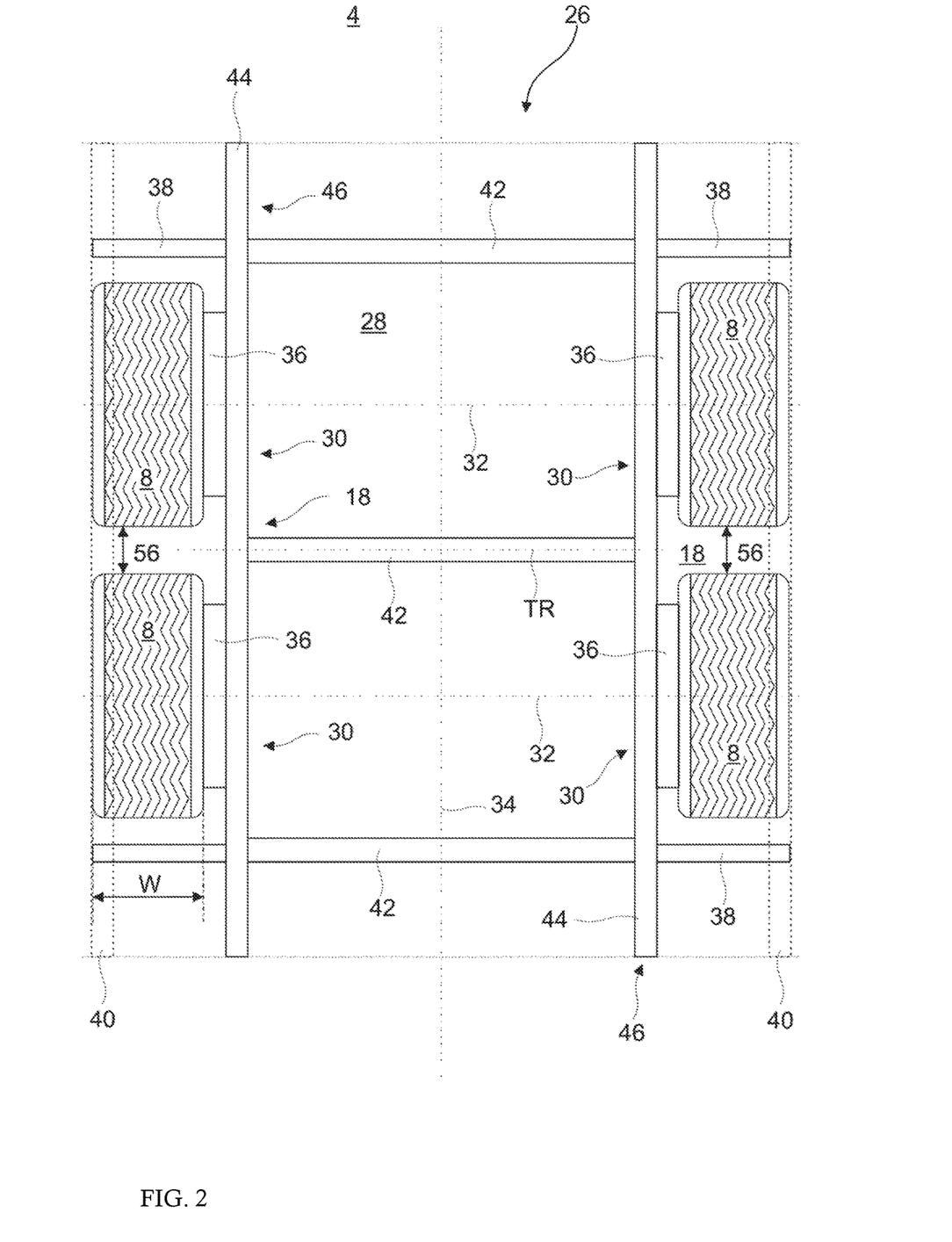
FIG. 2 provides a schematic illustration of an aerial view of a bus structure portion in accordance with a preferred embodiment of the invention.

FIG. 2 shows an aerial view of a bus unit, more precisely a portion of the structure 26 of the unit 4. For instance, the portion generally represents a half of a unit 4. The passenger platform 28 and steering modules 30 are represented. Two left steering modules 30 and two right steering modules 30 are joined, notably by pair, by the passenger platform 28. In the current figure, four steering modules 30 are connected to each other by the passenger platform 28. However, any other number is considered.

The wheels 8 have rotation axes 32. The rotation axes may be parallel according to a configuration of the steering modules 30. The wheels 8 may be disposed in a symmetric configuration with respect to a longitudinal axis 34, notably disposed at the middle of the unit 4. Each wheel may include a hub receiving a ring. The rim supports a tire which is inflated thereon. The inflating pressure of the tire shape the flat against the ground G.

Each steering module 30 may include an actuator 36 associated with the corresponding wheel 8 in order to swivel it; and consequently, to the deflect the driving direction of the unit 4.

The structure 26 may define at least one, or several wheel housings 18. Each wheel housing may receive at least one wheel 8, and possibly two wheels 8. Transversal bars 38 may delimit longitudinally the wheel housings 18. The wheel housing 18 may also be defined by transversally outer beams 40. The transversally outer beams 40 may be over the wheels 8, notably at distance from the transversal bars 38.

The passenger platform 28 may include at least one integral element projecting from a left steering module 30 to a right steering module 30. For instance, the passenger platform 28 may include a beam, notably a transversal beam 42, which projects from a left steering module 30 to a right steering module 30 at a transversally opposed position. Two transversal beams 42 may be arranged at the longitudinal ends of the wheel housings 18, for instance at the longitudinal levels of the transversal bars 38.

The passenger platform 28 may include at least one longitudinal beam 44, or two longitudinal beams 44. The longitudinal beams 44 may form the transversal and/or vertical interfaces 46 with the wheel housings 18. The longitudinal beams 44 may project along the whole unit 4, and may each project along eight wheels 8. The longitudinal beams 44 may separate the transversal beams 42 from the wheels 8 and/or from the transversal bars 38.

When the rotation axes 32 of the wheels 8 are parallel to the transversal direction TR, the longitudinal distance 56 between the wheels S are smaller than the widths of the wheels 8. The longitudinal distances may be measured against the longitudinal ends of the wheels 8. A reduced longitudinal distance 56 improves safety since it blocks intrusions therebetween. Passengers behind said wheels 8 would be protected against side collisions.

Between the steering modules 30, and/or between the wheel housings 18, the passenger platform 28 extends over at least the half of the of the width of the bus. The distance between the steering modules 30 respectively between the wheel housings 18, may measure at least 1.50 m; and the width of the passenger platform 28 may measure between 2.00 m and 2.55 m; values included. Thus, the remaining passage between the wheel housing permits to two wheelchairs to cross each other.

Figure 3:
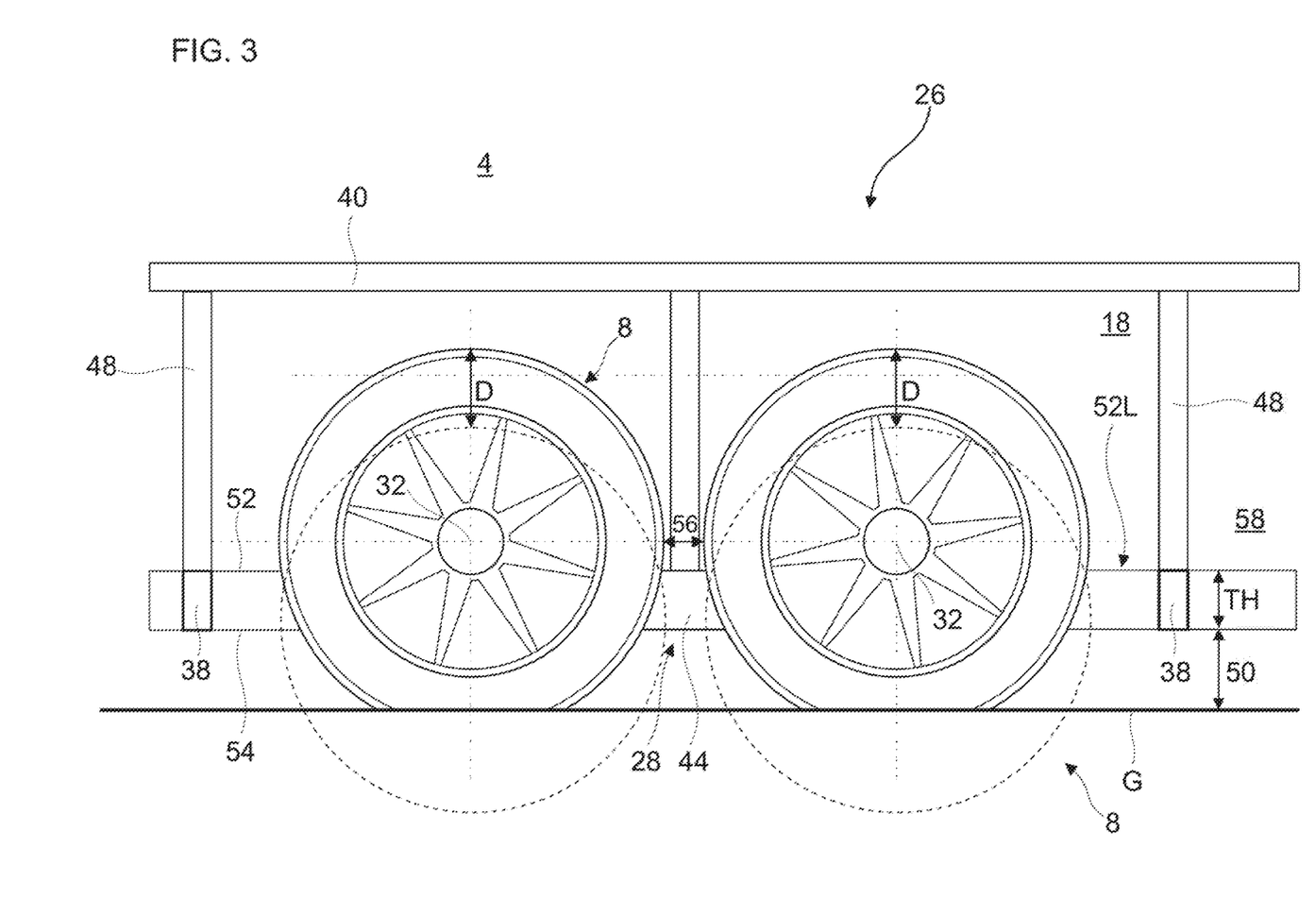
FIG. 3 provides a schematic illustration of side view of a bus structure portion in accordance with a preferred embodiment of the invention.

FIG. 3 provides a schematic illustration of a side view of the structure 26 forming a part of the bus. The portion may correspond to the portion as represented in FIG. 2.

The wheel housing 18 receives two wheels 8. The wheel housing 18 may be a left one or a right one. Its upper end is delimited by the transversal outer beams 40, and the longitudinal ends are formed by the transversal bars 38. The latter may be connected to the transversal outer beams 40 by means of vertical bars 48. The passenger platform 28, and notably a longitudinal beam 44, are disposed in the background, notably behind the wheels 8.

The wheels 8 may be movable with respect to the passenger platform 28. With respect to the passenger platform 28, the wheels 8 may be movable between an upper position (currently represented in solid lines) and a lower position (virtually represented in dotted lines). These positions, or configurations, may respectively correspond to a boarding position where the passenger platform 28 is lowered in order to ease access to the passenger compartment, and a driving position where the ground clearance 50 is increased in order to avoid hurting an obstacle on the ground G.

In the currently represented upper position, the rotations axis/axes 32 may be over the passenger platform 28. The rotation axis/axes 32 may be vertically distant from the passenger platform 28, and thus of its top surface 52, which may form thereon a main level 52L. The main level 52L may correspond to the average level of the floor surface of the passenger platform 28. The rotations axis/axes 32 may be vertically level with the passenger compartment 58.

In the lower position of the wheel(s) 8, the rotation axis/axes 32 may be vertically level with the passenger platform 28. The rotation axis/axes 32 may be vertically level with the longitudinal beam 44 and/or the transversal beams (not represented). The rotation axis/axes 32 may be below the main level 52L. The rotation axis/axes 32 may be vertically above the bottom surface 54 of the passenger platform 28.

The distance D between the upper position and the lower position may be greater than the thickness TH of the passenger platform 28. The distance D may be measured at the top of the wheels 8. The thickness TR may be constant along one or the two wheels 8. The thickness may be constant TH all along the wheel housing 18, and/or along the majority of the length of the unit 4.

The longitudinal distance 56 between the right wheels and between the left wheels is smaller than the distance D between the upper position and the lower position. This longitudinal distance 56 may be measured within a side couple of wheels 8, on the left side and/or on the right side of the bus. The longitudinal distance 56 may be measured in the upper position and/or in the lower position.

Figure 4:
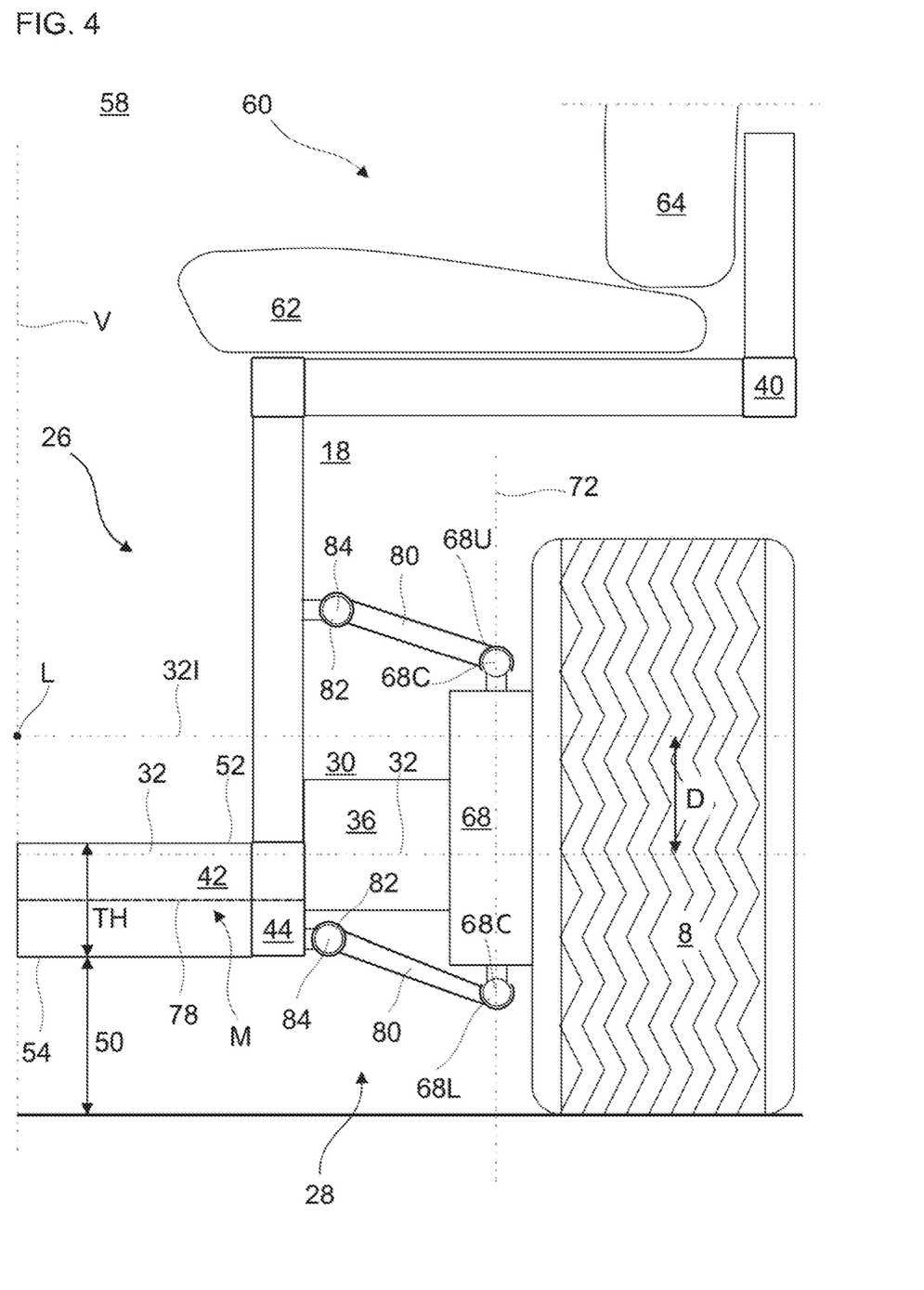
FIG. 4 provides a schematic illustration of longitudinal view of a steering module in accordance with a preferred embodiment of the invention.

FIG. 4 provides a schematic illustration of a longitudinal view of a steering module 30. The steering module 30 is currently represented in the lower position, a representation of the upper position is provided through an illustrative rotation axis 32I of the wheel 8. Distance D illustrates the course oldie rotation axis 32 between the lower position and the upper position.

The structure 26 may be generally symmetric with respect to a sagittal plan. Said sagittal plan may include the longitudinal axis and the vertical axis V. The structure 26 may include two symmetric steering modules 30. The structure 26 may include four steering modules 30 defining a rectangle between them. For the sake of conciseness, the following description will be carried out in relation with one of said steering modules 30, however it could apply to all of them. Then, the currently represented right steering module 30 may be connected to a left steering module (not represented) by the passenger platform 28. The current embodiment could apply to other or to each steering module 30 of the bus.

A seat 60 with a seat base 62 and a therefrom projecting backrest 64 is represented. The seat 60 may receive a passenger, and therefore, may form a seat place. The seat 60 is disposed above the steering module 30, and over the wheel 8. The wheel housing 18 may be arranged bellow the seat 60. The transversally outer beams 40 may span longitudinally over the wheel 8. The wheel housing 18 may separate the passenger compartment 58 from the wheel 8.

The structure 26 defines the ground clearance 50, which may be greater than thickness TH of the passenger platform 28. The transversal beam 42 and the longitudinal beam 44 may exhibit a same vertical thickness TH. The distance D between the upper position and the lower position may larger than the thickness TH, notably the average thickness or the maximal thickness, of the passenger platform 28.

The steering module 30 may comprise a knuckle 68. The knuckle 68 may enclose an upper pivot joint 68U and a lower pivot joint 68L. The rotation axis 32 may be disposed vertically between these pivot joints (68U; 68L)

The steering module 30 may comprise an actuator 36 adapted for pivoting the wheel 8 about a generally vertical swivel axis 72. The actuator 36 may be disposed within the wheel housing 18, and/or vertically level with the passenger platform 28. The passenger platform 28 projects and/or separates the actuator 36 of the right steering module 30 from the actuator of the left steering module (not represented). The passenger platform 28 may be a physical link between these actuators 36, and may fix them. The thickness TH of the passenger platform 28 may be constant from the right steering module 30 to the left steering module, which is notably transversally opposite and/or symmetric. The thickness TH may be constant between the opposite wheel housings 18.

The passenger platform 28 may include a top surface 52 and a bottom surface 54, which may define the vertical thickness TH. The passenger platform 28 may exhibit a vertical middle M, for instance at the middle of its thickness, and a horizontal middle plan 78 passing, at this vertical middle M. The passenger compartment 58 may start vertically from the top surface 52, which may form the floor surface thereof.

The steering module 30 may comprise swinging arms 80 in order to connect the knuckle 68 to the structure 26, and notably to the passenger platform 28. The transversally inner ends of the swinging arms 80 may be connected to the passenger platform 28 by means of inner pivot connections 82.

The inner pivot connections 82 may have horizontal swinging axes 84, notably colinear swinging axes 84. The upper and lower swinging arms 80 may be connected to the upper pivot joint 68U and to the lower pivot joint 68L respectively, and then rely the knuckle 68 to the passenger platform 28 while allowing a vertical motion. A system, for instance a suspension system and or a hydraulic cylinder, may apply an effort on the lower swinging arm 80.

In the lower position, the rotation axis 32 of the wheel 8 may be within the thickness TH of the passenger platform 28, for instance in the upper half. The rotation axis 32 may be below the top surface 52, and/or above the bottom surface 54. The top surface 52 may be the uppermost surface of the passenger platform 28. The bottom surface 54 may be the lowermost surface of the passenger platform 28. The main level 52L may be above the rotation axis 32.

In the lower position, the lower pivot joint 68L may be below the passenger platform 28. It may notably be below the bottom surface 54. Each pivot joints (68L; 68U) may have a centre point 68C.

The centre points 68C may be disposed on the vertical swivel axis 72. Thus, the actuator 36 may rotate the knuckle 68, and by way of consequence the wheel 8 about the centre points 68C.

Optionally, at least one or the pivot joints (68L; 68U) are ball joints. Thus, they allow rotations with respect to vertical axes and longitudinal axes of the knuckle 68.

In the lower position, the centre point 68C of the lower pivot joint 68L may be below the passenger platform 28. In the lower position, the centre point 68C of the lower pivot joint 68L may be vertically distant from and/or below the bottom surface 54. Other kind of pivot joints 68 may have centre points 68C to which the present features apply.

In the lower position, the horizontal middle plan 78 may be below the rotation axis 8 of the wheel 8, and/or above the lower pivot joint 68L; for instance above the centre point 68C of the lower pivot joint 68L. The horizontal middle plan 78 may be vertically between the rotation axis 8 of the wheel 8 and the lower pivot joint 68L.

In the lower position, the vertical thickness TH of the passenger platform 28 may be at least partially, or totally, between the rotation axis 32 of the wheel 8 and the lower pivot joint 68L. A portion, notably a horizontal layer, of at least the half of the passenger platform thickness, for instance a lower half or a middle half, may be disposed between the rotation axis 8 of the wheel 8 and the lower pivot joint 68L. This arrangement may optimize the vertical offset of the knuckle 68 with respect to the passenger platform 28.

Thus, mechanical stress may be reduced in the swinging arms 80. The stress reduction is also observed in the pivot joints 68U and 68L, and in the inner pivot connections 82 as well; in spite the steering motion is kept. In addition, it may be easier to manage the parasite swivelling of the wheel 8 when the swinging arms 80 pivot. The flexion stress within the passenger platform 28 may be less limiting with regard to mechanical resistance. Thus the invention enables to use a thin platform while reducing the stress therein. The proposed configuration may foster compression stress in the upper half over traction stress in the lower half, which improves the fatigue resistance caused by repeatedly applied loads or chocs.

In the upper position, the illustrative rotation axis 324 of the wheel 8 may be above the passenger platform 28, and notably the top surface 52. The rotation axis 32 may be vertically separated and distant from the top surface 52. In the upper position, the lower pivot joint 68L may be vertically level with the passenger platform 28, and/or above the bottom surface 54. The illustrative rotation axis 32I of the wheel 8 may be above the main level 52L.

In the lower position, the lower swinging arm 80 may be partially level with the passenger platform 28. In the upper position, the lower swinging arm 80 may be totally within the vertical thickness TH of the passenger platform 28.

The distance D between the upper position and the lower position may larger than the thickness TH, notably the average thickness or the maximal thickness of the passenger platform 28.

The vertical space between the rotation axis 32 in the lower position and the upper position defines a vertical zone within which the rotation axis 32 oscillates. The vertical space vertically overlaps the platform, and possibly the actuator of the wheel module.

Figure 5:
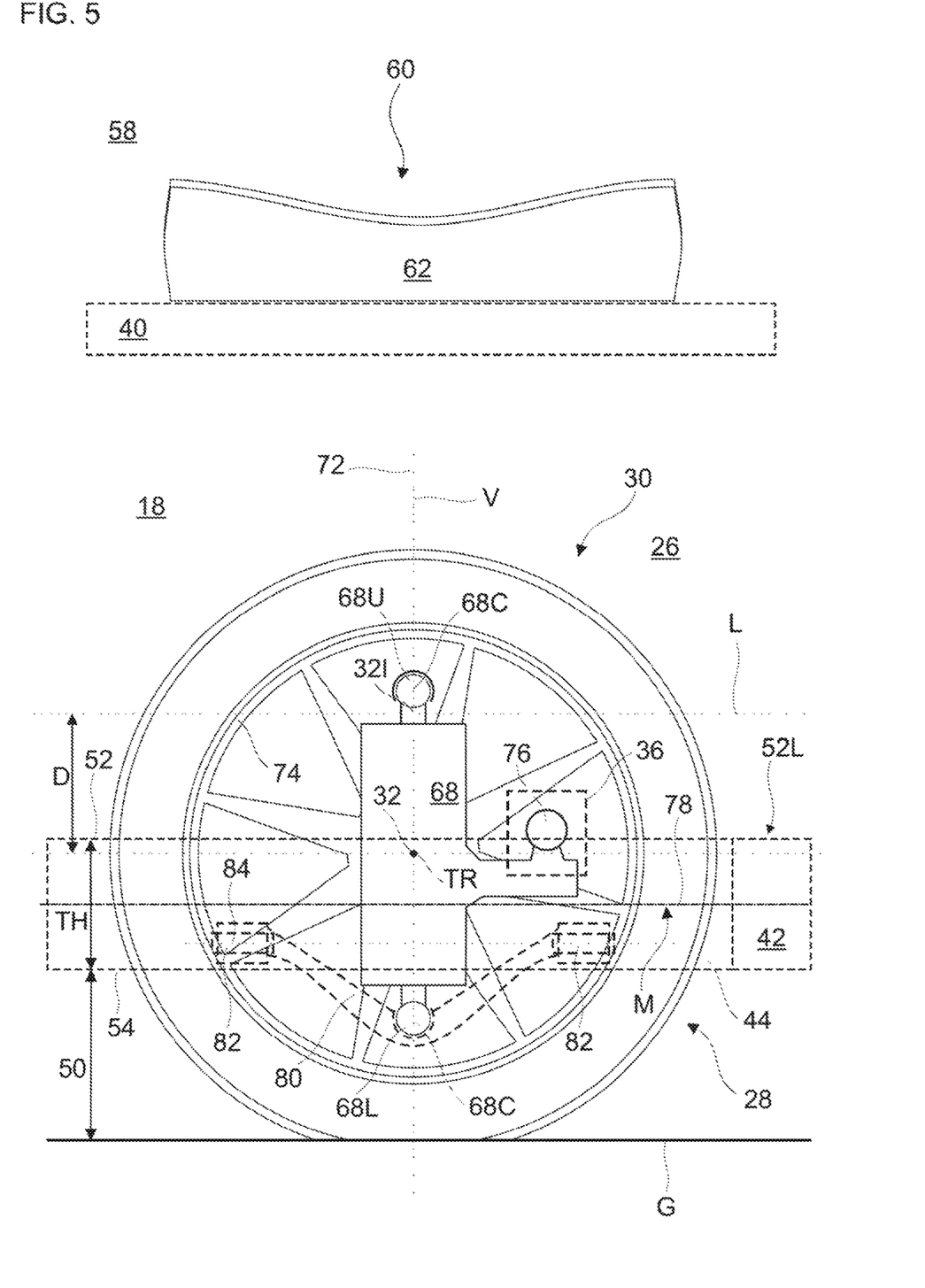
FIG. 5 provides a schematic illustration of transversal view of a steering module in accordance with a preferred embodiment of the invention.

FIG. 5 provides a schematic illustration of a transversal view of a steering module 30. The steering module is represented from the inside of the passenger compartment 58. The steering module 30 is currently represented in the lower position, a representation of the upper position is provided through an illustrative rotation axis 32I of the wheel 8. Distance D illustrates the course of the rotation axis 32 between the lower configuration and the upper configuration.

The structure 26 may be generally symmetric with respect to a sagittal plan. Said sagittal plan may include the longitudinal axis L and the vertical axis V. The structure 26 may include two symmetric steering modules 30. The structure 26 may include four steering modules 30 defining a rectangle between them. For the sake of conciseness, the following description will be carried out in relation with one of said two or four steering modules 30, however it could apply to all of them. The current embodiment could apply to other or to each steering module 30 of the bus; or of the unit respectively.

A seat 60 with a seat base 62 is represented. The seat 60 may receive a passenger, and therefore, may form a seat place. The seat 60 is disposed above the steering module 30, and over the wheel 8. The wheel housing 18 may be arranged bellow the seat 60. The transversally outer beams 40 may span longitudinally over the wheel 8. The wheel housing 18 may separate the passenger compartment 58 from the wheel 8.

The structure 26 defines the ground clearance 50, which may be greater than the thickness TH of the passenger platform 28. The transversal beam 42 and the longitudinal beam 44 may be as thick as one another. They may have a same vertical thickness TH. The distance D between the upper position and the lower position may larger than the thickness TH. The considered thickness may by an average thickness or a maximal thickness, of the passenger platform 28.

The steering module 30 may comprise a knuckle 68. The knuckle 68 may include an upper pivot joint 68U at the upper end, and a lower pivot joint 68L at the lower end. The rotation axis 32 may be disposed vertically between these pivot joints (68U; 68L). The pivots joints (68U; 68L) may be within the height of the rim 74 of the wheel 8. The inner radius of the rim 74 may be larger than the distance between the rotation axis 32 and each of the pivot joints (68U; 68L).

Each steering module 30 may comprise an actuator 36 adapted for pivoting the wheel 8 about a vertical swivel axis 72. The actuator 36 may pilot the wheel angle. The knuckle 68 may include a swivel joint 76, notably a ball joint, to which the actuator 36 is connected. The actuator 36 may be arranged vertically level with the wheel housing 18; at least partially. Providing a steering actuator 36 at each wheel 8 permits to control the wheel pair specifically. For instance, it allows to drive the bus along a curve, or along a diagonal. Thus, the bus may drive as a "crab"; notably in a side direction, which is convenient for narrow bus stops.

The steering modules 30 may define at least one pair of steering modules 30 (only one represented), with a left one and a right one. In each pair, the steering modules 30 are transversally opposite and/or symmetric. In at least one pair, the passenger platform 28 spans transversally and/or forms a separation between the actuator 36 of the right steering module 30 and the actuator of the left steering module. The passenger platform 28 may be a transversal link between these actuators 36 in order to fix them to the structure 26. The thickness TH of the passenger platform 28 may be constant from the right steering module 30 to the left steering module. The thickness TH may be constant between the opposite wheel housings 18.

The passenger platform 28 may include a top surface 52 and a bottom surface 54, which may define the vertical thickness TH, also possibly of the beams (42; 44). The passenger platform 28 may exhibit a vertical middle M, for instance at the same distance from the surface 52 and 54, and a horizontal middle plan 78 passing at this vertical middle M. The passenger compartment 58 may start vertically from the top surface 52, which may form the passenger floor.

The steering module 30 may comprise an upper swinging arm (not represented for the sake of clarity) and a lower swinging arm 80. The lower swinging arm 80 links the knuckle 68 to the structure 26, and notably to the passenger platform 28. The knuckle 68 may be connected to the transversal beam 42, notably through the longitudinal beam 44. The transversally inner ends of the swinging arms 80 may be connected to the passenger platform 28 by means of inner pivot connections 82. The inner pivot connections 82 may exhibit a common swinging axe 84. The swinging axe 84 may be substantially horizontal. The upper and lower swinging arms 80 may be connected to the upper pivot joint 68U and to the lower pivot joint 68L respectively. Their pivot movements allow the knuckle 68 and the wheel 8 to move vertically. Each steering module 30 may include stops for limiting the vertical motion of the knuckle 68 between the upper position and the lower position. The stops may engage the swinging arms 80.

A system, for instance a suspension system and/or a hydraulic cylinder, may apply an effort on the lower swinging arm 80.

In the lower position, the rotation axis 32 of the wheel 8 may be enclosed in the vertical thickness TH of the passenger platform 28, for instance in the upper half of the passenger platform 28. The rotation axis 32 may be below the top surface 52, and/or above the bottom surface 54. The top surface 52 may be the uppermost surface of the passenger platform 28. The main level 52L may be above the rotation axis 32.

In the lower position, the lower pivot joint 68L may be below the passenger platform 28. It may notably be at a lower level than the bottom surface 54. It may be closer to the ground G than the bottom surface 54. Thus, the actuator 36 may control the orientation of the knuckle 68 about to the vertical swivel axis 72. The same may apply to the wheel 8.

Optionally, at least one or the pivot joints (68L; 68U) is a ball joint. Each ball joint may constrain three degrees of freedom ball joints, and allow three rotations about the longitudinal axis L, the transversal direction TR, and the vertical axis V.

In the lower position, the centre point 68C of the lower pivot joint 68L may be at a lower level than the passenger platform 28. In the lower position, the centre point 68C of the lower pivot joint 68L may be vertically remote from the bottom surface 54.

In the lower position, the ground G may be nearer from the horizontal middle plan 78 than from the rotation axis 8 of the wheel 8. The lower pivot joint 68L; and notably its the centre point 68C; may be nearer from the ground G than the horizontal middle plan 78. The horizontal middle plan 78 may be vertically at an intermediate position between the rotation axis 8 of the wheel 8 and the lower pivot joint 68L.

In the lower position, the vertical thickness TH of the passenger platform 28 may be located, at least partially or totally, between the rotation axis 8 of the wheel 8 and the lower pivot joint 68L. A vertical portion, notably a horizontal layer, of at least the half of the passenger platform thickness, for instance a lower half or a middle half, may be disposed between the rotation axis 8 of the wheel 8 and the lower pivot joint 68L. This arrangement may reduce the distance between the knuckle 68 and the passenger platform 28.

In the upper position, the illustrative rotation axis 32I of the wheel 8 may be above the passenger platform 28, and notably the top surface. The rotation axis 32 may be vertically distant from the top surface 52. There may be a vertical separation between them. In the upper position, the lower pivot joint 68L may be vertically level with the passenger platform 28, and/or above the bottom surface 54. The illustrative rotation axis 32I of the wheel 8 may be above the main level 52L.

Figure 6:
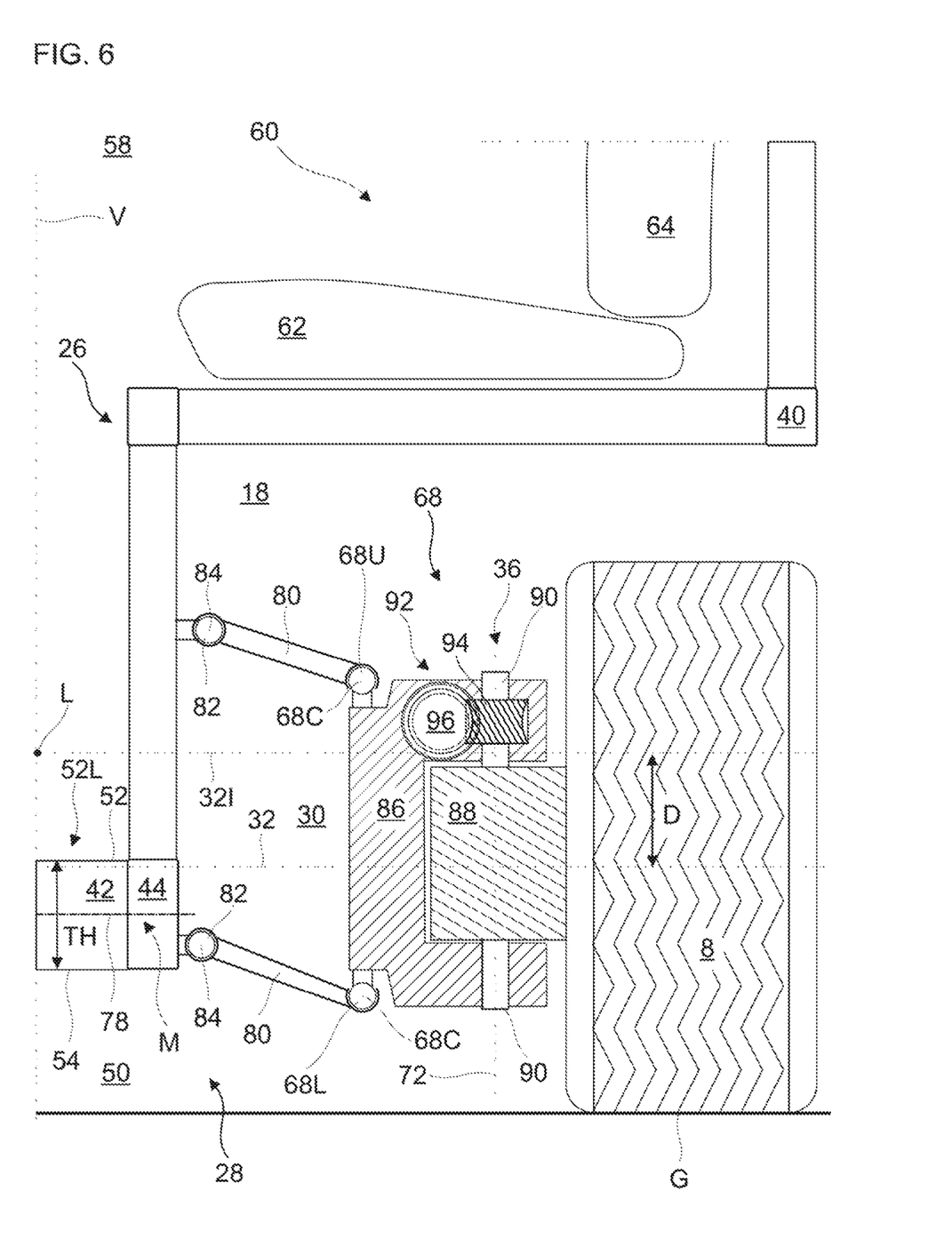
FIG. 6 provides a schematic illustration of longitudinal view of a steering module in accordance with a preferred embodiment of the invention.

FIG. 6 provides a schematic illustration of a longitudinal view of a steering module 30. The steering module 30 is currently represented in the lower position, a representation of the upper position of the rotation axis of the wheel is provided through an illustrative rotation axis 32I. The distance D illustrates the course of the rotation axis 32 between the lower position and the upper position.

The structure 26 may be generally symmetric with respect to a sagittal plan. Said sagittal plan may include the longitudinal axis L and the vertical axis V. The structure 26 may include two symmetric steering modules 30. For the sake of conciseness, the following description will be carried out in relation with one of said two steering modules 30, however it could apply to the both. Then, the currently represented right steering module 30 may be connected to a left steering module (not represented) by the passenger platform 28. The current embodiment could apply to other or to each steering module 30 of the bus; or of the unit respectively.

A seat 60 with a seat base 62 and a therefrom projecting backrest 64 is represented. The seat 60 may receive a passenger, and therefore, may form a seat place. The seat 60 is disposed above the steering module 30, and over the wheel 8. The wheel housing 18 may be arranged bellow the seat 60. The transversally outer beam 40 may span longitudinally over the wheel 8. The wheel housing 18 may separate the passenger compartment 58 from the wheel 8.

The passenger platform defines the ground clearance 50 which may vary according to the vertical position of the wheel 8 with respect to the passenger platform 28. The ground clearance 50 may be larger than the vertical thickness TH, preferably at least: two or four times larger. The transversal beam 42 and the longitudinal beam 44 may exhibit a same vertical thickness TH. The vertical thickness TH may be the average thickness or the maximal thickness of the passenger platform 28. The steering module 30 may comprise a steering knuckle 68. The steering knuckle 68 may be understood as a wheel support with articulation means adapted for steering the associated wheel. For instance, said wheel support may be configured for allowing pivot motions of the wheel about a vertical pivot axis. The steering knuckle 68 may include an inner body 86 toward the passenger platform 28, and an outer body 88 which is linked to the wheel 8. In the current embodiment, the inner body 86 may include a recess in which the outer body 88 is engaged. However, the contrary is considered as well.

The inner body 86 and the outer body 88 may be swivel with respect to each other. The inner body 86 and the outer body 88 may be connected by vertical pivot joints 90, notably an upper one and a lower one. They may swivel about a vertical swivel axis 72. The vertical pivot joints 90 may have an upper end toward the seat 60, and a lower end toward the ground G. The inner body 86 may enclose an upper pivot joint 68U and a lower pivot joint 68L. The rotation axis 32 may be disposed vertically between these pivot joints (68U; 68L), and across the bodies 86-88.

The steering module 30 may comprise a steering actuator 36 adapted for pivoting the wheel 8 about the vertical swivel axis 72. The actuator 36 may be disposed within the wheel housing 18, and/or vertically level with the passenger compartment 58. It may be considered that the passenger platform 28 separates the actuator 36 of the right steering module 30 from the actuator of the left steering module (not represented). The passenger compartment 58 may separate the steering modules 30. The thickness TH of the passenger platform 28 may be constant from the right steering module 30 to the left steering module, which is notably transversally opposite and/or symmetric.

The thickness TH may be constant between the opposite wheel housings 18.

The steering actuator 36 may comprise a worm drive 92 in order to vary the orientation of the outer body 88 with respect to the inner body 86 about the vertical swivel axis 72. The worm drive 92 may be coupled to the upper vertical pivot joint 90. For instance, a worm gear 94 may be rigidly fixed to the outer body 88, notably to the upper vertical pivot joint 90. A worm 96 may be rotatably mounted to the inner body 86, and may mesh with the worm gear 94. A rotation of the worm 96 about a longitudinal axis causes the worm gear 94 to pivot about the vertical swivel axis 72. Thus, the wheel 8 may be deflected. According to another approach, the worm drive may be associated with the lower vertical pivot joint 90.

The worm drive 92 in accordance with the invention optimizes compactness and an angular motion of the steering module 30.

The passenger platform 28 may include a top surface 52 and a bottom surface 54, which may define the vertical thickness TH. The passenger platform 28 may exhibit a vertical middle M, for instance at the middle of its thickness, and a horizontal middle plan 78 passing at this vertical middle M. The passenger compartment 58 may start vertically from the top surface 52, which may form the passenger floor therein.

The steering module 30 may comprise swinging arms 80 in order to connect the inner body 86 to the structure 26, and notably to the passenger platform 28. The swinging arms 80 may be adapted for blocking rotation of the inner body 86 with respect to the vertical swivel axis 72. The transversally inner ends of the swinging arms 80 may be connected to the passenger platform 28 by means of inner pivot connections 82. The inner pivot connections 82 may have horizontal swinging axes 84, notably colinear swinging axes 84. The upper and lower swinging arms 80 may be connected to the upper pivot joint 68U and to the lower pivot joint 68L respectively, and then rely the knuckle 68 to the passenger platform 28 while allowing a vertical motion. In the lower position, the lower swinging arm 80 may be partially level with the passenger platform 28. In the upper position, the lower swinging arm 80 may be totally within the vertical thickness TH of the passenger platform 28. A system, for instance a suspension system and/or a hydraulic cylinder, may apply an effort on the lower swinging arm 80.

In the lower position, the rotation axis 32 of the wheel 8 may be within the thickness TH of the passenger platform 28 for instance in the upper half. The rotation axis 32 may be below the top surface 52, and/or above the bottom surface 54. The top surface 52 may be the uppermost surface of the passenger platform 28. The bottom surface 54 may be the lowermost surface of the passenger platform 28. The main level 52L may be above the rotation axis 32.

In the lower position, the lower pivot joint 68L may be below the passenger platform 28. It may notably be below the bottom surface 54. Each pivot joints (68L; 68U) may have a centre point 68C. The pivot joints (68L; 68U) may comprise a ball joint(s) and/or hinged joint(s). Optionally, the pivot joints (68L; 68U) are hinged joints.

In the lower position, the centre point 68C of the lower pivot joint 68L may be below the passenger platform 28. In the lower position, the centre point 68C of the lower pivot joint 68L may be vertically distant from the bottom surface 52 and/or below the bottom surface 52.

In the lower position, the horizontal middle plan 78 may be below the rotation axis 8 of the wheel 8, and/or above the lower pivot joint 68L; for instance, above the centre point 68C of the lower pivot joint 68L. The horizontal middle plan 78 may be vertically between the rotation axis 8 of the wheel 8 and the lower pivot joint 68L.

In the lower position, the vertical thickness TH of the passenger platform 28 may be at least partially, or totally between the rotation axis 8 of the wheel 8 and the lower pivot joint 68L. A vertical portion, notably a horizontal layer, representing at least one half of the passenger platform thickness may be disposed between the rotation axis 8 of the wheel 8 and the lower pivot joint 68L. The vertical portion may be a lower half or a middle half which is arranged at the vertical middle of the passenger platform 28. This arrangement may reduce the distance between the knuckle 68 and the passenger platform 28.

Thus, mechanical stress is reduced in the swinging arms 80. The stress reduction is also observed in the pivot joints 68U and 68L, and in the inner pivot connections 82 as well; in spite the steering motion is kept. In addition, it may be easier to manage the parasite swivelling of the wheel 8 when the swinging arms 80 pivot. The flexion stress within the passenger platform may be less limiting with regard to mechanical resistance. Thus, the invention enables to use a thin platform while reducing the stress therein. The proposed configuration may foster compression stress over traction stress, which improves the fatigue resistance caused by repeatedly applied loads or chocs.

In the upper position, the illustrative rotation axis 32I of the wheel 8 may be above the passenger platform 28, and notably the top surface 52. The rotation axis 32 may be vertically separated and distant from the top surface 52. The top surface may be the uppermost surface of the passenger platform 28. In the upper position, the lower pivot joint 68L may be vertically level with the passenger platform 28, and/or above the bottom surface 54. The illustrative rotation axis 32I of the wheel 8 may be above the main level 52L.

In the lower position, the lower swinging arm 80 may be partially level with the passenger platform 28, and partially bellow. In the upper position, the lower swinging arm 80 may be totally within the vertical thickness TH of the passenger platform 28.

Figure 7:
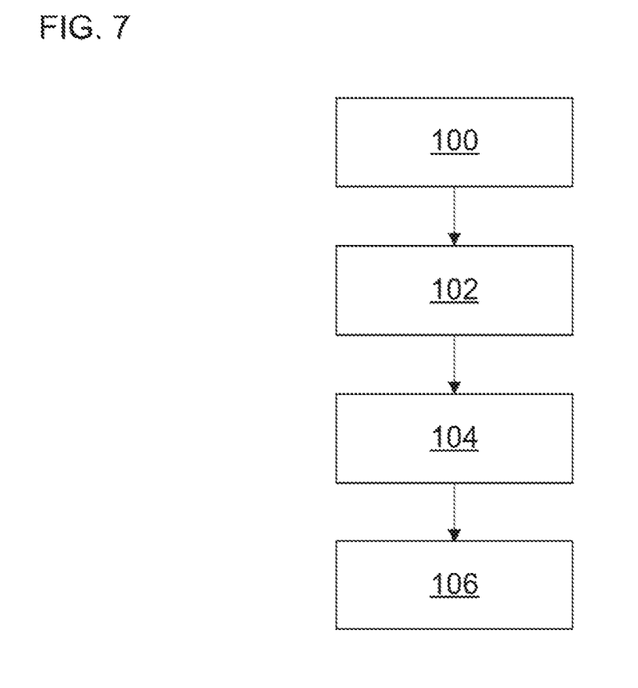
FIG. 7 provides a schematic illustration of a diagram block of a bus steering process in accordance with a preferred embodiment of the invention.

FIG. 7 provides a schematic illustration of a diagram block illustrating a bus steering process in accordance with the invention.

The bus steering process comprises the following steps:

transmitting 100 a left steering instruction, notably a first left steering instruction, to the steering actuator of the left steering module, and communicating 102 a right steering instruction, notably a first right steering instruction, to the steering actuator of the right steering module.

transmitting 104 a second left steering instruction to the steering actuator of the left steering module, and communicating 106 a second right steering instruction to the steering actuator of the right steering module.

At steps transmitting 100 and communicating 102, the first left instruction differs from the first right instruction. They may comprise different pivoting angle instructions. These instructions may be communicated at different moment, for instance one after the other. By way of illustration, the left steering module may start pivoting before the right steering module. The passenger comfort is improved. A mechanical action is triggered on the suspension system. These instructions may be in different directions such that a toe-in or a toe-out are compensated or triggered.

The second left and second right instruction are identical and/or simultaneous. Thus, the bus is adapted for driving in a side trajectory, such as in a crab configuration. This eases access to a narrow bus stop.

The bus may be similar or identical to the ones as described in relation with anyone of FIGS. 1 to 6, and their combinations.

Each figure may be considered as a separate embodiment of the invention.

The combination of FIGS. 1 to 5 may form an embodiment of the invention.

The combination of FIGS. 1 to 3 and 5 to 6 may form an embodiment of the invention,

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A bus comprising a passenger compartment, a left steering module and a right steering module, the left steering module and the right steering module each including:
   a steering knuckle including an upper pivot joint and a lower pivot joint,
   a wheel defining a rotation axis, said wheel being rotatably attached to the steering knuckle, the wheel being movable between an upper position that defines a boarding position of the bus that lowers the passenger compartment to ease access to the passenger compartment by a passenger and a lower position that defines a driving position of the bus to improve ground clearance of the bus,
   a steering actuator configured for pivoting the steering knuckle, the bus further including a passenger platform delimiting the passenger compartment and transversally joining the left steering module and the right steering module, and
   said passenger platform being at least partially vertically disposed between the rotation axes of the wheels and the lower pivot joints of the steering modules, wherein a majority of a vertical thickness of the passenger platform is vertically disposed between the rotation axis of the wheel and the lower pivot joint when the wheel is in the lower position and the lower pivot joint is vertically level with the passenger platform when the wheel is in the upper position.

2. The bus in accordance with claim 1, wherein the passenger platform comprises a horizontal middle plan at a mid-thickness of the passenger platform, the horizontal middle plan being disposed vertically between the rotation axis of the wheel and the lower pivot joint, of at the left steering module and the right steering module.

3. The bus in accordance with claim 1, wherein each of the left steering module and the right steering module includes an upper swinging arm above the passenger platform joined to the corresponding upper pivot joint, and a lower swinging arm vertically level with the passenger platform and joined to the corresponding lower pivot joint.

4. The bus in accordance with claim 1, wherein each of the left steering module and the right steering module includes an inner body facing the passenger platform, and an outer body facing the associated wheel, the inner body and the outer body being rotatably mounted with respect to each other about a vertical swivel axis, and wherein the steering actuator includes a worm drive in order to pivot the outer body with respect to the inner body, the worm drive including a worm rotatably linked to the inner body and a worm gear fixed to the outer body.

5. The bus in accordance with claim 1, wherein the passenger platform extends transversally from the actuator of the left steering module to the actuator of the right steering module, at least one or each actuator being selected from the group including: an electric actuator, a pneumatic actuator, and a hydraulic actuator.

6. The bus in accordance with claim 1, wherein the passenger platform includes a transversal beam transversally extending from the left steering module to the right steering module, said transversal beam transversally extending along the actuator of the left steering module and the actuator of the right steering module.

7. The bus in accordance with claim 1, wherein the vertical thickness is between the left steering module and the right steering module, at least one of: the actuator of the left steering module and the actuator of the right steering module being disposed in said vertical thickness.

8. The bus in accordance with claim 1, wherein the passenger platform includes a bottom surface, a top surface, and the vertical thickness from the bottom surface to the top surface, the actuator of at least one of the left steering module and the right steering module being disposed above the bottom surface and below the top surface.

9. The bus in accordance with claim 1, wherein the bus includes longitudinal beams at interfaces between the steering modules and the passenger platform, the longitudinal beams being at least partially vertically disposed between the rotation axes of the wheels and the lower pivot joints.

10. The bus in accordance with claim 1, wherein each of the left steering module and the right steering module includes a wheel housing, the passenger platform extending from said wheel housings, and longitudinally extends from longitudinal ends of the wheel housings.

11. The bus in accordance with claim 1, wherein the passenger platform includes a top surface delimiting the passenger compartment, and wherein at least one of the steering knuckles of the left steering module and the right steering module is vertically movable with respect to the passenger platform between position and a lower position by means of an vertical actuator, wherein in the lower position the top surface is above at least one or each rotation axis, and in the upper position the top surface is below at least one or each rotation axis; and a bottom surface of the passenger platform is above at least one of the lower pivot joints in the lower position, and below said lower pivot joints in the upper position.

12. The bus in accordance with claim 11, wherein the wheel of each of the left steering module and the right steering module is a front wheel, each of the left steering module and the right steering module further comprising a rear wheel behind the corresponding front wheel, wherein a longitudinal distance between front wheels and rear wheels is smaller than the distance D between the upper position and the lower position of at least one of the steering modules.

13. The bus in accordance with claim 1, wherein between the left steering module and the right steering module, the passenger platform extends over at least a majority of a width of the bus; and the width of the bus is of at most 2.55 meters.

14. An articulated bus, comprising:
   a passenger platform defining a vertical thickness;
   a passenger compartment above the passenger platform;
   a left steering module and a right steering module transversally joined by the passenger platform, each of the left and right steering modules including:
      a wheel defining a rotation axis, the wheel being movable between an upper position that defines a boarding position of the articulated bus that lowers the passenger compartment to ease access to the passenger compartment by a passenger and a lower position that defines a driving position of the articulated bus to improve ground clearance of the articulated bus, a steering knuckle including an upper pivot joint and a lower pivot joint which is below the passenger platform, and a steering actuator configured for pivoting the corresponding steering knuckle, said actuator being vertically disposed within the vertical thickness of said passenger platform, wherein a majority of a vertical thickness of the passenger platform is vertically disposed between the rotation axis of the wheel and the lower pivot joint when the wheel is in the lower position and the lower pivot joint is vertically level with the passenger platform when the wheel is in the upper position.

15. The bus in accordance with claim 14, wherein the passenger platform comprises an upper plate and a lower plate, the steering actuator of at least one of the left steering module and the right steering module being vertically disposed between the upper plate and the lower plate.

16. The bus in accordance with claim 14, wherein the steering actuator of at least one of the left steering module and the right steering module being vertically disposed between the rotation axes of the wheels and the lower pivot joints.

17. The bus in accordance with claim 14, wherein at least one of the rotation axes are movable between the upper position and the lower position defining a vertical zone, which is at a vertical distance in each of the left steering module and the right steering module, the vertical distance defines an oscillation zone for the rotation axis of the wheel, the vertical distance vertically overlapping the vertical thickness of the passenger platform.

18. A bus, comprising:
a passenger compartment, and
a right steering module including:
a right wheel defining a rotation axis,
a right steering knuckle including an upper pivot joint and a lower pivot joint,
a right steering actuator for pivoting the right steering knuckle,
a left steering module including:
a left wheel defining a rotation axis,
a left steering knuckle including an upper pivot joint and a lower pivot joint, and
a left steering actuator for pivoting the left steering knuckle,
the bus further including a passenger platform under the passenger compartment; and vertically disposed at least partially between the rotation axes and the lower pivot joints, wherein the left and right wheels are movable between an upper position that defines a boarding position of the bus that lowers the passenger compartment to ease access to the passenger compartment by a passenger and a lower position that defines a driving position of the bus to improve ground clearance of the bus; and
wherein the passenger platform transversally joins the left steering module to the right steering module, and transversally extends along the right actuator and the left actuator, and wherein a majority of a vertical thickness of the passenger platform is vertically disposed between the rotation axis of the left and right wheels and the lower pivot joint of the left and right wheels when the left and right wheels are in the lower position and the lower pivot joints of the left and right wheels are vertically level with the passenger platform when the left and right wheels are in the upper position.

19. The bus in accordance with claim 18, wherein the passenger platform comprises a bottom surface under the right actuator and the left actuator.

* * * * *